(12) United States Patent
Shaw (10) Patent No.: US 6,418,664 B1
(45) Date of Patent: Jul. 16, 2002

(54) SELF-WATERING PLANT POT (76) Inventor: Harkeem Shaw, 573 Buchanan St., Hillside, NJ (US) 07205

( * ) Notice: Subject to any disclaimer, the term of this patent is extended or adjusted under 35 U.S.C. 154(b) by 0 days.

(21) Appl. No.: 09/862,924

(22) Filed: May 22, 2001

(51) Int. Cl.$^7$ .............................................. A01G 25/00
(52) U.S. Cl. ................................................ 47/79; 47/81
(58) Field of Search ................................ 47/79, 61, 81

(56) References Cited

U.S. PATENT DOCUMENTS

| | | | | |
|---|---|---|---|---|
| 2,695,474 A | * | 11/1954 | Barstow | 47/81 |
| 4,052,818 A | * | 10/1977 | Hagerty | 47/81 |
| 4,171,593 A | * | 10/1979 | Bigglestone | 47/79 |
| 4,527,354 A | * | 7/1985 | Sellier | 47/81 |
| 4,557,071 A | * | 12/1985 | Fah | 47/81 |
| 4,741,125 A | * | 5/1988 | Demorest | 47/81 |
| 4,916,858 A | * | 4/1990 | Hobson | 47/81 |
| 4,999,947 A | * | 3/1991 | Whitaker | 47/81 |
| 5,129,183 A | * | 7/1992 | Haw | 47/81 |
| 5,168,664 A | * | 12/1992 | Deutschmann, Sr. | 47/79 |
| 5,375,371 A | * | 12/1994 | Wells | 47/81 |
| 5,410,839 A | * | 5/1995 | Granger | 41/40.5 |
| 5,430,972 A | * | 7/1995 | Wianecki | 47/66 |
| 5,502,924 A | * | 4/1996 | Lee | 41/79 |
| 6,226,921 B1 | * | 5/2001 | Kang | 47/81 |

* cited by examiner

Primary Examiner—Charles T. Jordan
Assistant Examiner—Danielle Rosenthal (57) ABSTRACT

A Self-Watering Plant Pot Device comprises a water refill light indicator, dual feeding wick, float and reservoir all of which the principle of capillary action is utilized. The flowerpot of the present invention comprises a cylinder for containing the soil to raise a plant, a lower reservoir for storing the water and plant food, and a water refill light indicator with a float. In addition, a dual feeding wick is used which will adequately supply water into the soil of the plant. The wick is made of a nylon material (or any material that has capillary action) that will never rot or deteriorate. One advantage of this invention is that frequent watering is not required, thereby, making it possible to leave the plant unattended for an extended period. A water refill light indicator is another advantage used to signal the owner to refill the reservoir with water and/or plant food when necessary.

6 Claims, 9 Drawing Sheets

SELF-WATERING PLANT POT

FIELD OF THE INVENTION

The present invention relates to a Self-Watering Plant Pot Device comprised of a water refill light indicator, dual feeding wick, float, and reservoir all of which the principle of capillary action is utilized. The flowerpot comprising a cylinder for containing the soil to raise a plant and a reservoir for storing water.

BACKGROUND OF THE INVENTION

In conventional flowerpots, water is put over the surface of the soil directly hence; the water remains in the pot for a short period. Excess water put into the pot is drained away through the drain holes in the bottom of the flowerpot. Regardless of the amount of water put into the flowerpot, the water will remain for only a short period. Furthermore, in the summer season, the surface soil appears dry despite the fact that water is profusely contained within the soil. In such a case, if the plant pot receives water too frequently, the plant's root can rot due to the excess watering. Therefore, the troublesome task of adequately watering a plant exists. The water supplied by this automatic self-watering plant pot device would assure that plants will never be over or under watered. In conclusion, an individual would never need to manually water his plants, but instead only have to periodically refill the reservoir container.

SUMMARY OF THE INVENTION

It is the object of this invention to provide a Self-Watering Plant Pot Device specifically adapted for plants of various sizes. In accordance with the invention, the plant Pot device comprises a cylinder, an upper and lower bottom reservoir section, and a water refill light indicator with a float. The upper reservoir section is for ed with a centered opening through which the diametrically tapered cylinder bottom is engaged. The lower reservoir section has a disposed flange that inter-locks with the upper reservoir section when the two are engaged.

A further objective of the present invention is to provide a device in which water and other liquids can be systematically transferred to the plant growing media. While at the same time providing a water reservoir sufficient in size so that the plant can be supplied for several weeks before water replenishment is necessary. The plant and soil are positioned into the cylinder. The cylinder is placed on the top of the upper reservoir housing. Water is then systematically transferred to the cylinder by a dual-feeding wick using capillary action.

Another objective of the invention is the water refill light indicator. The float in the reservoir has a light attached to the top part of the float stem. The float moves up and down depending on the water level in the reservoir. When the water is low, the light on the float comes on and when the water is refilled, the light goes off. These and other objectives and advantages of the invention will become apparent as the following description precedes in particular reference to the application drawings. Yet, another feature of the invention is to provide a watering device that can be inexpensively manufactured. In accordance with the invention, the self-watering Plant Pot Device can be relatively simple and inexpensive to produce via molding.

BRIEF DESCRIPTION OF THE DRAWING

The above objective and other advantages of the present invention will become more apparent by describing the preferred embodiment of the present invention in more detail with reference to the attached drawing in which.

DESCRIPTION OF THE PREFERRED EMBODIMENT

Figure 1:
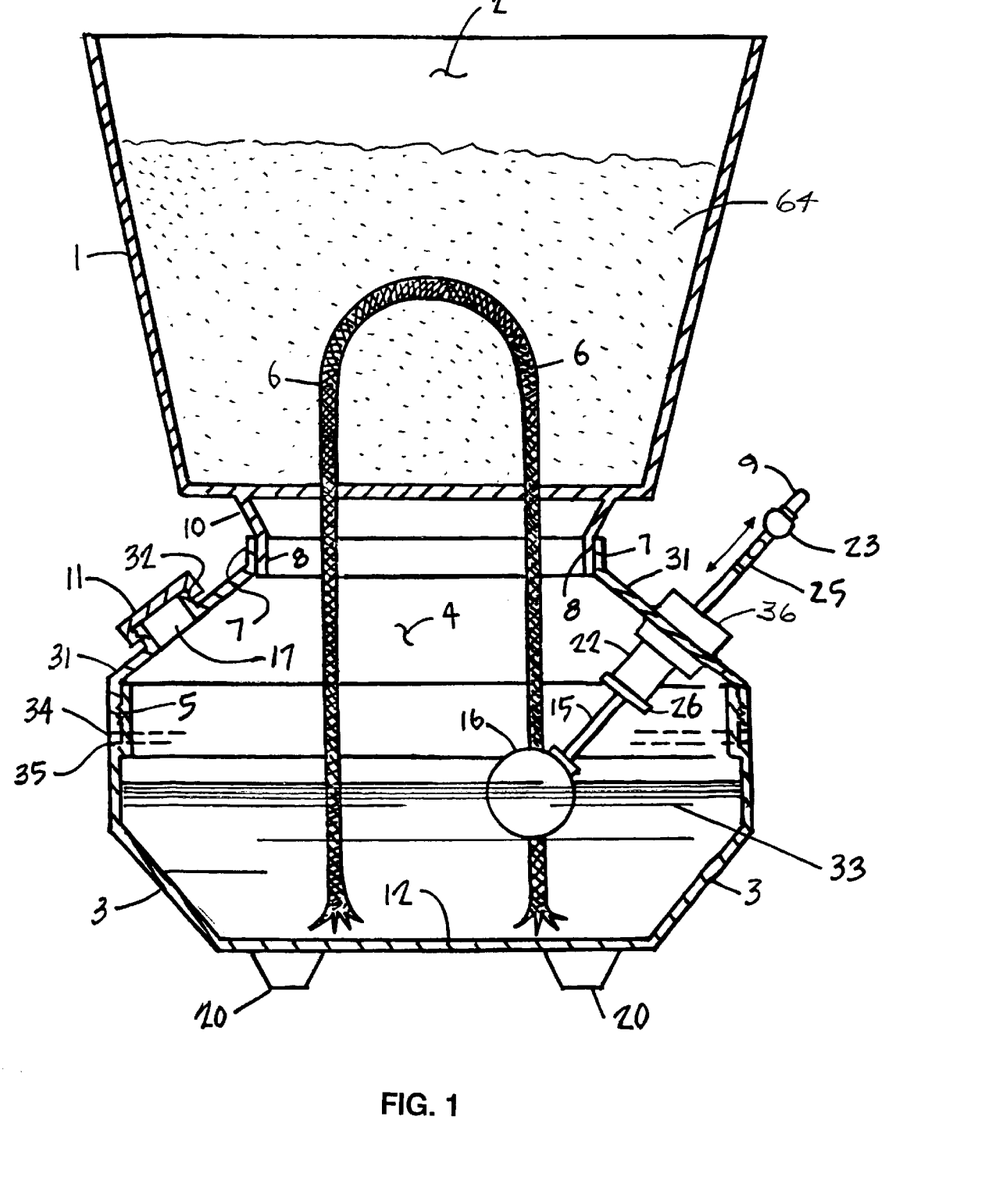
FIG. 1 is a sectioned view of the preferred embodiment of the present invention with pot elements in place.
Figure 2:
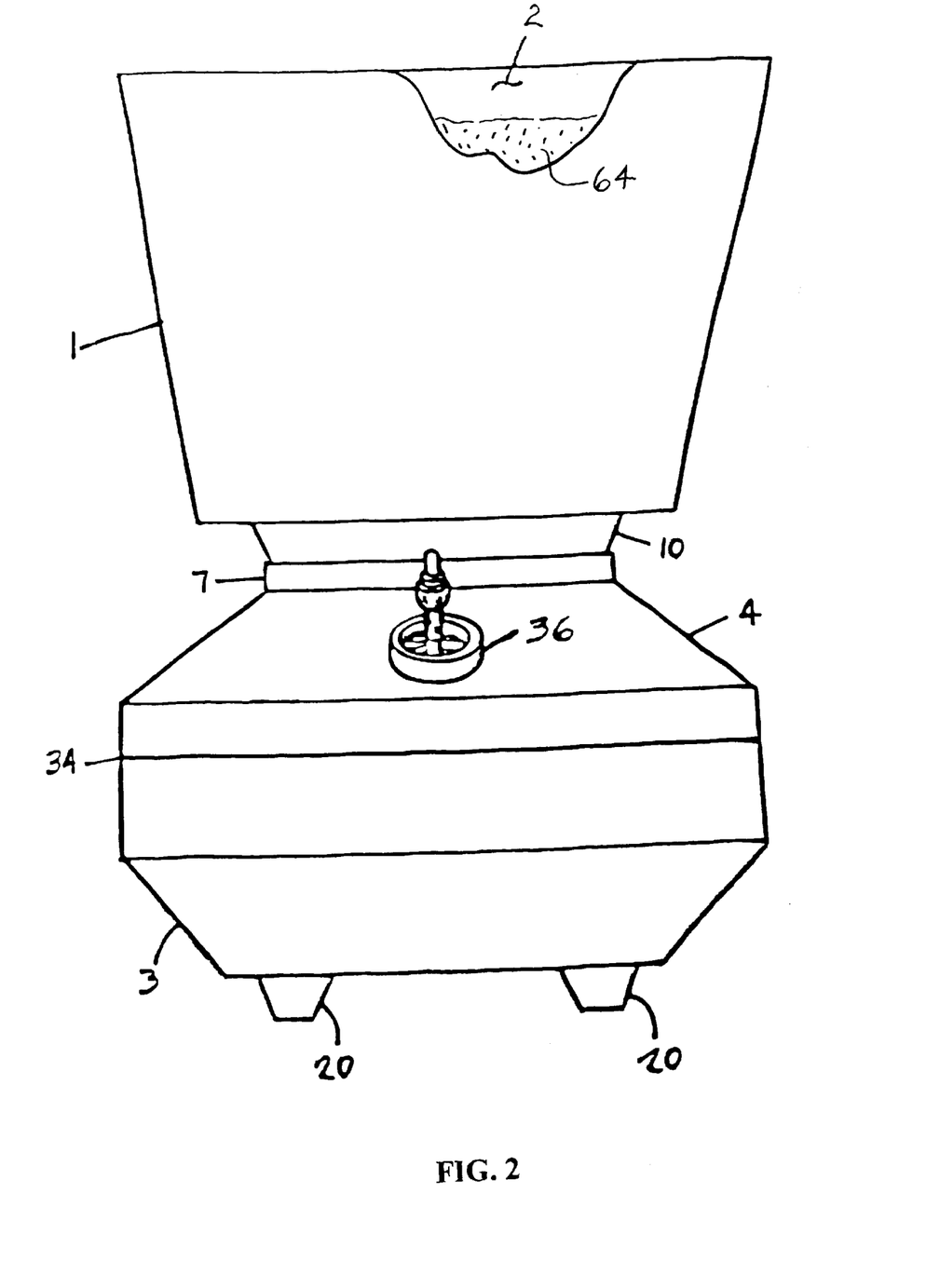
FIG. 2 shows a front view of the preferred embodiment of the present invention.
Figure 3:
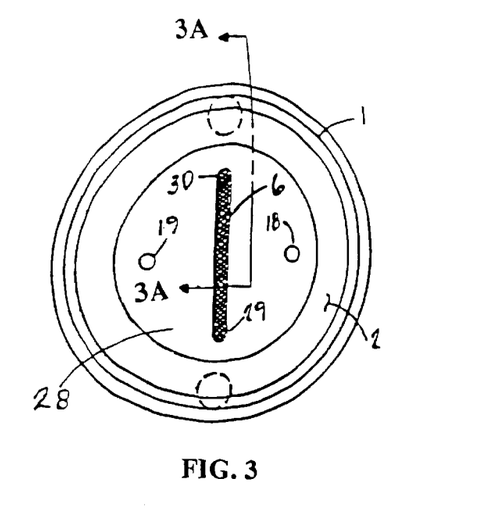
FIG. 3 shows a top view of the preferred embodiment of the present invention with dual feeding wick and drain holes in place.
Figure 3A:
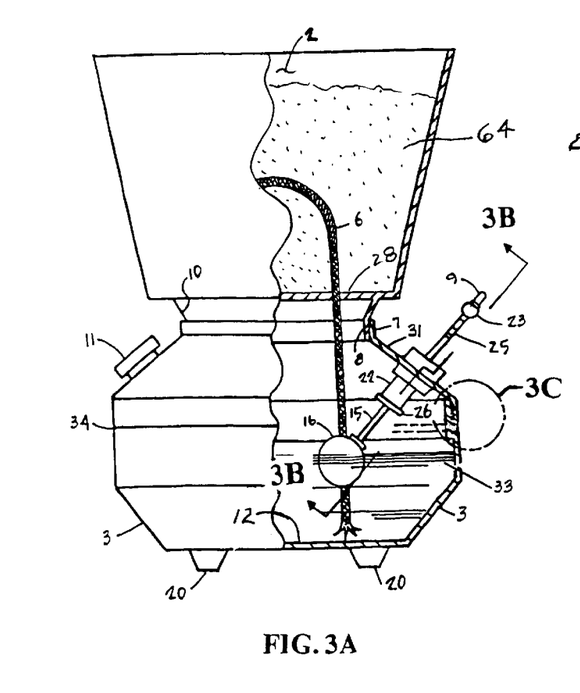
FIG. 3A is a broken section view of the preferred embodiment of the present invention showing, float stem and indicator element in place.
Figure 3B:
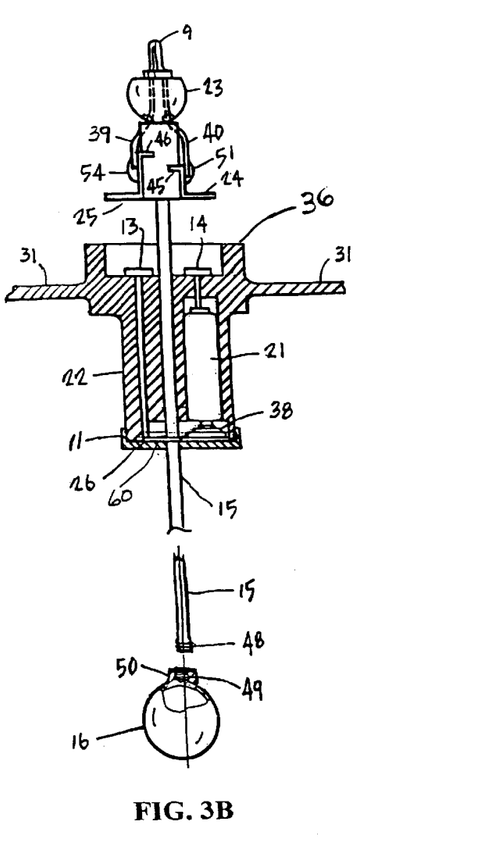
FIG. 3B show a sectional view of the present invention showing, sphere, light indicator, stem, float and element thereof.
Figure 3C:
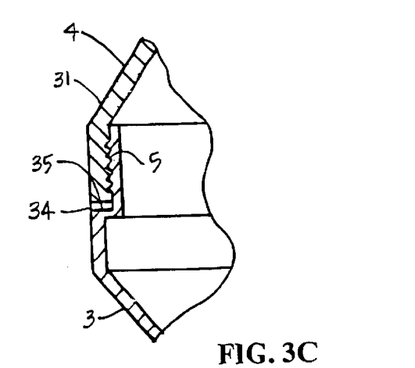
FIG. 3C is a broken out side section view of the present invention, showing seal and threaded elements in place.
Figure 3D:
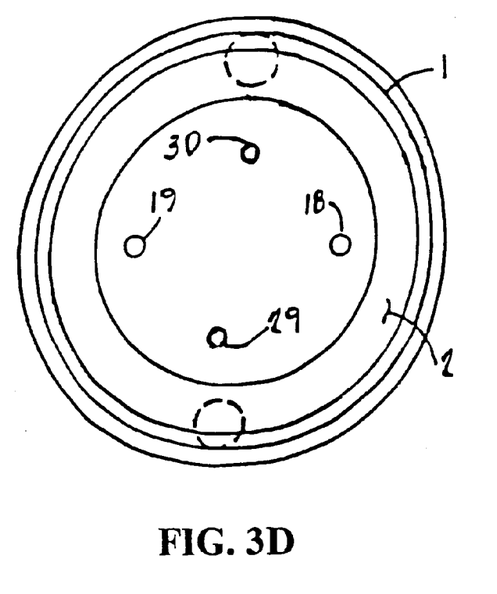
FIG. 3D shows a top view drain and wick holes of the preferred embodiment of the present invention.
Figure 4:
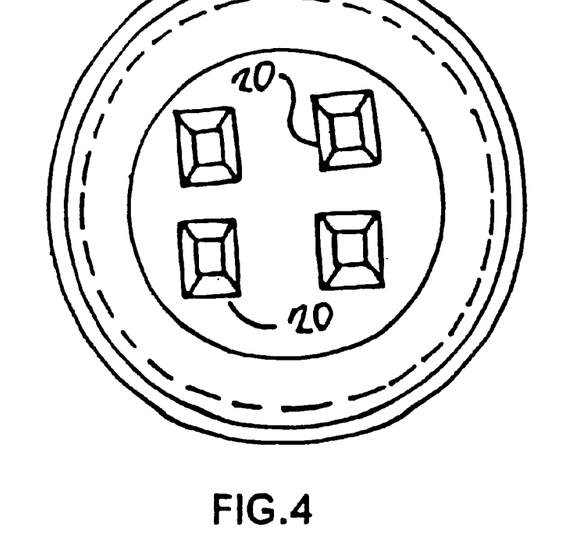
FIG. 4 is a bottom view of a preferred embodiment of the present invention showing legs to support the plant pot device.
Figure 9:
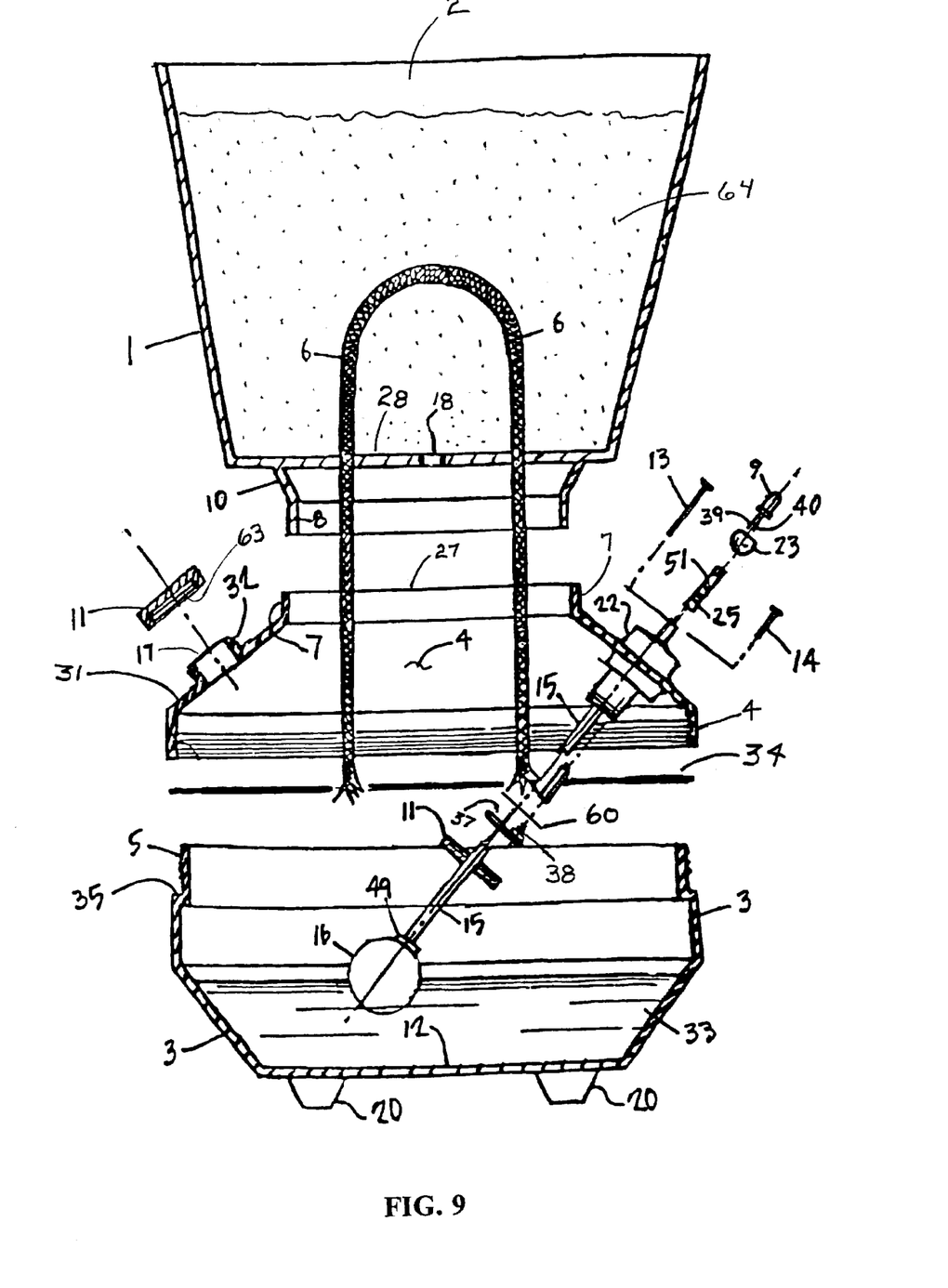
FIG. 9 shows complete exploded view of all elements of the embodiment of the present invention.

FIG. 1 gives reference to the Self-Watering Plant Pot Device according to the present invention. The Self- Watering Plant Pot Device comprises a cylinder 1 containing the soil 64 for growing a plant and the reservoir housing assembly 3 and 4 for storing water 33. The lower reservoir housing 3 is formed with an inward shoulder 35 and a threaded continuous outer rim 5 (FIG. 3C and FIG. 9). The upper reservoir housing 4 screws onto the lower reservoir housing 3 with a seal 34 (FIG. 9). The upper reservoir housing 4 has a beveled edge 31 in which can be found a threaded sprout 32 having an opening 17 for water refilling that is sealed with a water refill cap 11. The cap is formed with continuous inner threads 63. Supporting feet 20 are located on the underside of the lower reservoir floor 12. This completes the reservoir assembly. The cylinder 1 has an opening 2 that can also be used for water refilling. The cylinder 1 is provided with a plurality of small holes 18, 19,29, and 30, into which a dual feeding wick 6 of absorbent material is inserted (FIG.3). The upper reservoir housing 4 has a top opening 27 (FIG. 9) to receive said wick 6. The cylinder inner rim 8 is formed along the circumferential edge of the lower boundary surface 10 of the cylinder 1 so that it can be mounted on the top outer rim 7 of the upper reservoir housing 4 (FIG. 9). The controlling method of the water supply can be described as such. One end of the dual feeding wick 6 is inserted through a hole 29, and the other end of is inserted through an adjacent hole 30 of the cylinder floor 28 (FIG. 3 and FIG. 3A). Soil 64 is positioned in the cylinder 1 with the dual feeding wick 6 being erected to project upwardly to rest in the middle of the soil in the cylinder 1 (FIG. 1), the opposite ends of the wick are positioned to rest on the floor of the lower reservoir 12. This is done so that water 33 can be delivered into the soil 64 thoroughly. The length of the dual feeding wick 6 will vary depending on the size and depth of the cylinder 1. The dual feeding wick 6 can be made of any material providing a capillary action necessary for water transmission (i.e. nylon, cotton, wool, synthetic fabric, or any combination of these or other materials).

Figure 5:
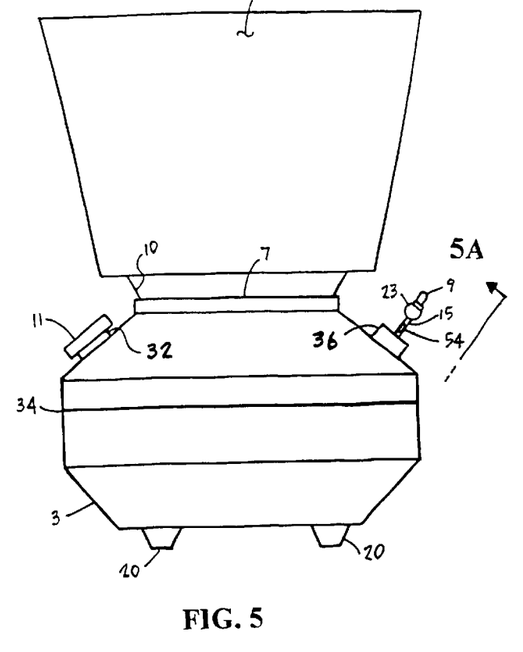
FIG. 5 shows a right side elevational view of the preferred embodiment of the present invention showing the water refill cap and upper indicator light.
Figure 5A:
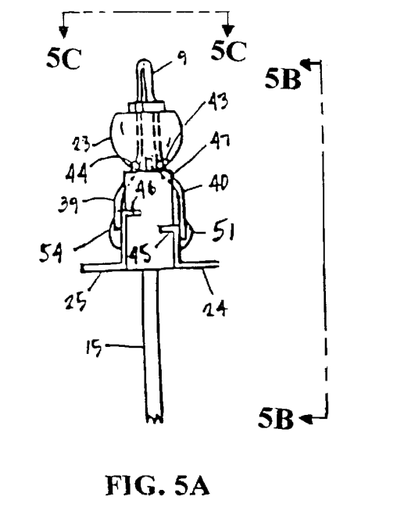
FIG. 5A show a view of the present invention in more details that is of indicator light stem and stem body. View also shows sphere conductor legs, arms and Light Emitting Diode (LED).
Figure 5B:
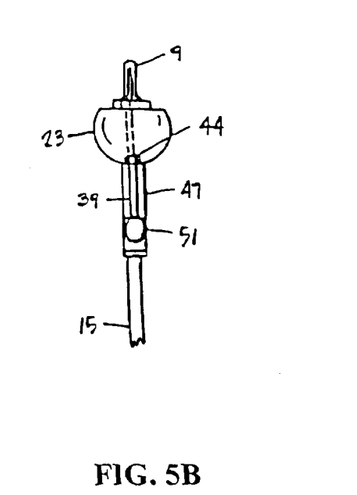
FIG. 5B is a right side view of preferred embodiment of the present invention (See FIG. 5A)
Figure 5C:
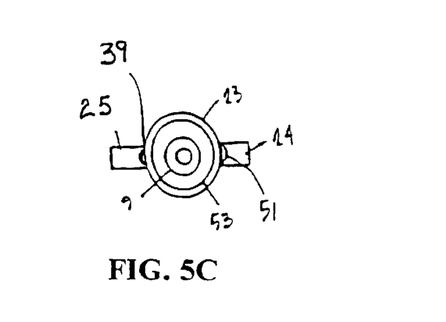
FIG. 5C shows a top view of the preferred embodiment of the present invention (See FIGS. 5A & 5B)
Figure 5D:
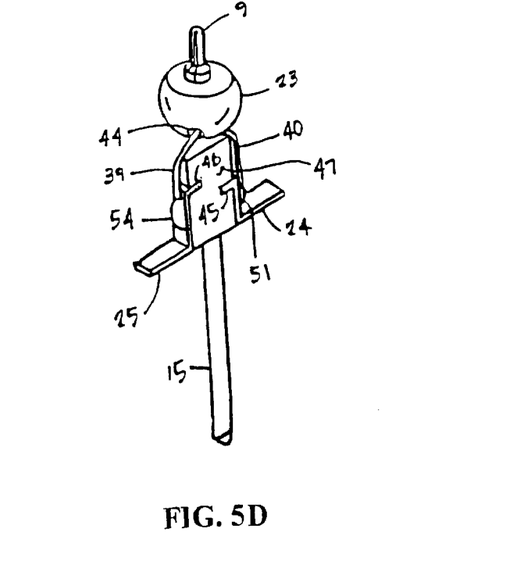
FIG. 5D is a perspective view of the preferred embodiment of the present invention showing 5A, FIG. 5B and FIG. 5C assemble
Figure 6:
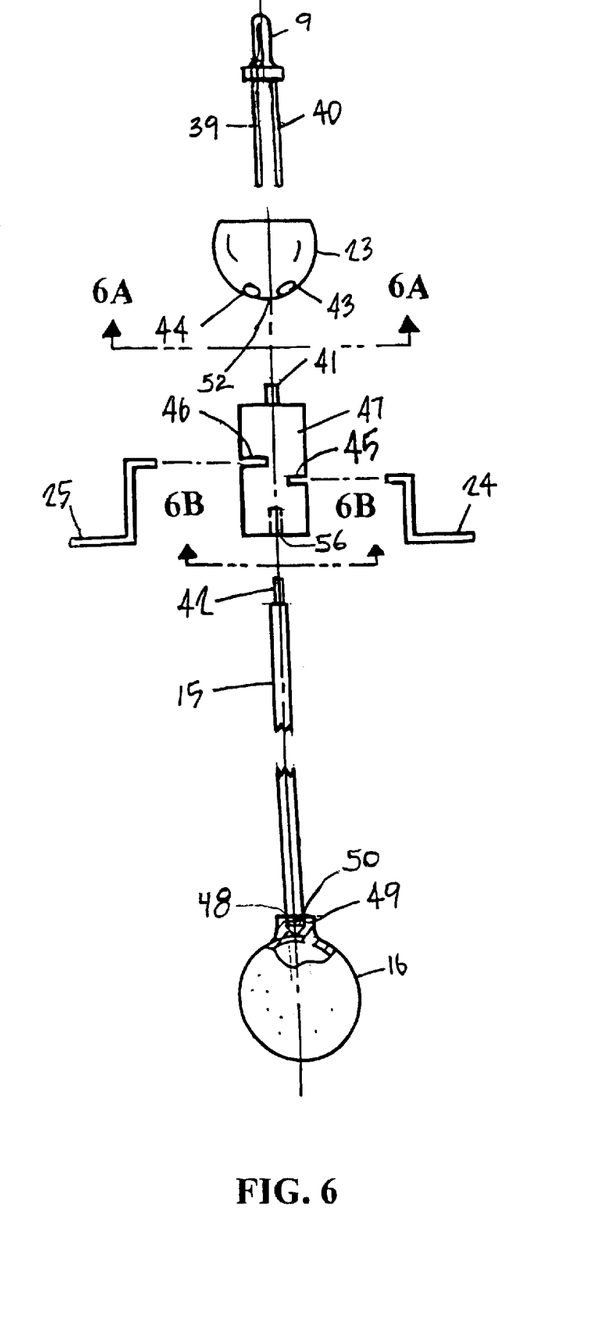
FIG. 6 is an exploded view of the present invention showing all elements of FIG. 5D.
Figure 6A:
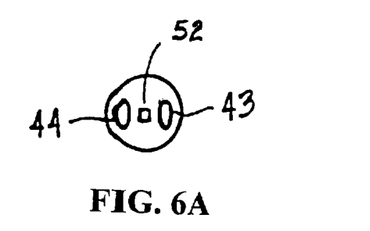
FIG. 6A is a bottom view of the body peg element of the float assembly of the present invention.
Figure 6B:
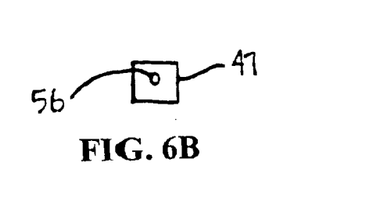
FIG. 6B is a bottom view of the sphere of the present invention showing the bottom view of the sphere.
Figure 7:
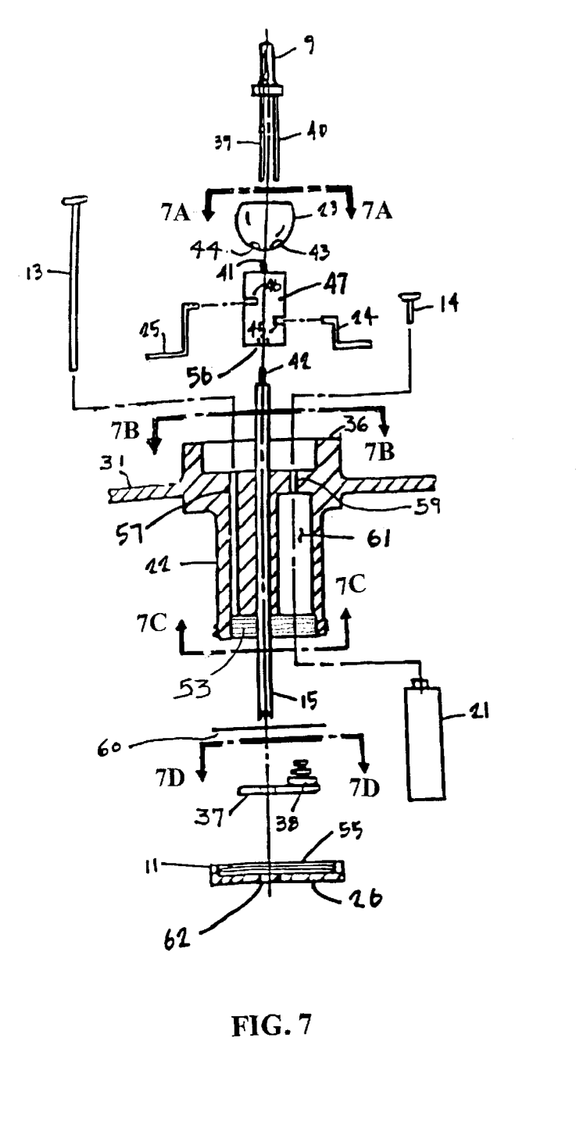
FIG. 7 is an exploded view showing all elements of the preferred embodiment of the present invention showing conductor legs, indicator sphere, conductor terminals, battery, spring cap which will be explained in detail of the present and detail description.
Figure 7A:
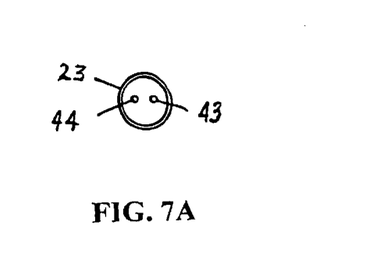
FIG. 7A is a top view of the sphere of the present invention.
Figure 7B:
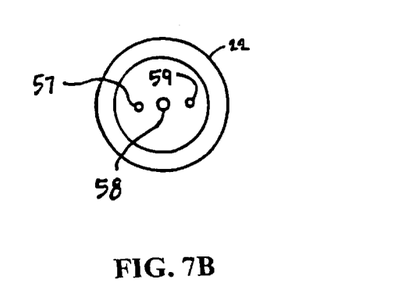
FIG. 7B is an under view of the float sprout element of the float assembly of the present invention.
Figures 7C, 7D:
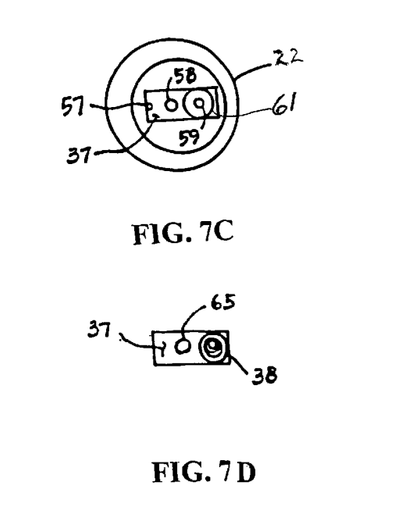
FIG. 7C is a top view of the float spout element of the float assembly of the present invention.
FIG. 7D shows a top view of the long flat conductor and short spring contacts of the present invention.
Figure 8:
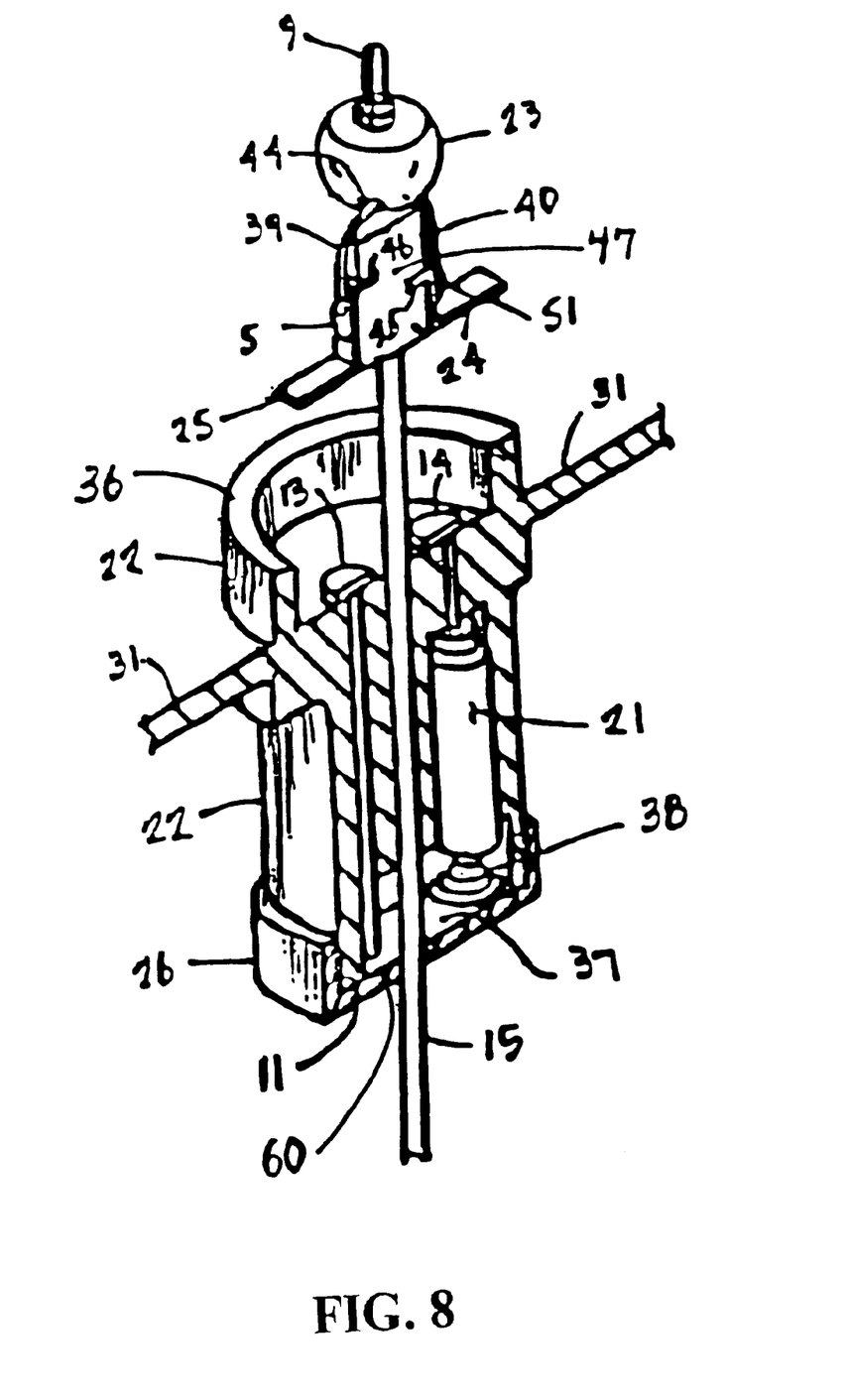
FIG. 8 is a perspective sectional view of the float assembly of the present invention and all elements thereof.

Now referring to FIG. 1, the float assembly. The indicator stem 15 travels up and down accordingly, depending on the water level. It is enclosed in the stem guide sprout housing 36 (FIG. 1). The float system is equipped with a sphere 23; the sphere has two holes (43 and 44) and a square mounting hole 52 (FIG. 6A). The body stub 41 is located underneath the sphere 23 (FIG. 6). The sphere 23 is mounted on the body stub 41. The Light Emitting Diode indicator 9 is mounted on the sphere 23, the body peg 47 has a left foot conductor 25 and right foot conductor 24. The feet conductor 24 and 25 are inserted into the feet slots 46 and 45. The conductor Light Emitting Diode leads (39 and 40) are inserted through holes 43 and 44 and bent to make contact with the conductor legs 24 and 25. They are soldered in place. The stem stub 42 is inserted into the lower portion of the body peg 47. The Light Emitting Diode legs (39 and 40) are secured to the body peg 47 by using solder 54. Solder 54 is placed on the left side of the body peg 47 and solder 51 is placed on the right side of the body slot (FIG. 5A). The indicator stem stub 42 is inserted into the body peg-mounting hole 56. The indicator stem 15 is threaded 48 at the bottom of the stem (FIG. 3B and FIG. 6). The threaded indicator stem 15 is screwed into the float boss 49 on the float 16. The float boss 49 has inner threads 50 to receive the lower part of the indicator stem outer threads 48 (FIG. 3B and FIG. 6) Now, referring to FIG. 7 the water refill Light Emitting Diode (LED) Indicator 9, battery 21, case 22, terminals 13 and 14, conductors 24 and 25, spring contacts 37 and 38 and indicator stem 15. The water refill LED Indicator 9 has a negative 40 and positive 39 lead. The Light Emitting Diode 9 is used to alert the owner to water a plant by blinking on and off. The flashing diode 9 has two leads 39 and 40, that are mounted on top of the Light Emittng Diode indicator, which is inserted though the sphere 23, which is placed on the body stub 41, which is attached to the body peg 47 and also attached to the water indicator stem 15, that is attached to a float 16 forming the entire float device. As the water level increases, the float 16 will move up and when the water level decreases, the float will descend indicating a need for water 33. The battery 21 is postioned with the negative side on top of the spring contact 38 and the long terminal 13 positioned on the flat contact 37. When the water level decreases, the float descends and the feet conductors 24 and 25 will make contact with the battery terminals 13 and 14 on the battery housing case 22, which is powered by an enclosed battery 21. This action will cause the light to blink on and off alerting the plant owner to water their plant. Now referring to FIG. 7, the battery housing. The battery housing case 22 is made from plastic. The battery housing 22 has a long terminal guide 57 and a short terminal guide 59, used for housing the battery terminals 13 and 14. The battery housing 22 has a battery cap 26 that is threaded 55 onto the battery housing threads 53. FIG. 7C shows the battery housing 22, long terminal guide 57, short terminal guide 59 and the indicator stem guide 58 that moves freely upward and downward. The battery chamber 61 houses the battery. The battery cap 26 is equipped with a center guide 62 and a seal 60 (FIG. 7). This detailed description completes the embodiment of the present invention, thus the Self-Watering Plant Pot Device of the present invention removes the hassle of frequent watering and allows plants to be left conveniently unattended during lengthy absences such as a long trip

I claim:

1. An automatic self-watering plant pot device for receiving a plant and automatically allowing for the transmission of liquids to the growing medium of a plant comprising:
    a) a cylinder distribution member having an inlet fluid communication;
    b) a refillable reservoir housing for storage of said liquids;
    c) engaging means for said cylinder to said refillable reservoir housing;
    d) a dual feeding wick for transmission for said liquids for said refillable reservoir housing to a said growing medium of a plant in said cylinder; and
    e) a refill light indicator for regulating said liquids in said refillable reservoir housing wherein the refill light indicator is operable only when the dual feeding wick is in communication with said liquids.

2. An automatic self-watering plant pot device for supporting said growing medium of a plant, as claimed in claim 1, wherein said cylinder comprises:
    a) a inwardly taped side wall,
    b) a bottom floor with four chamber openings,
    c) two openings for receiving said dual feeding wick, and two other openings which serve as drain holes that prevent over watering of said growing medium of a plant.

3. An automatic self-watering plant pot device, as claimed in claim 2, wherein said refillable reservoir housing comprises:
    a) an upper reservoir section with inner threads, a water refill hole, supporting means for holding said refill light indicator and engaging means having an opening at its upper end for allowing access of said dual feeding wick from said cylinder; and b) a lower reservoir section including outer threads, walls being closed to define said refillable reservoir's housing capacity for holding liquids, an opening at the top, a plurality of supporting feet projecting downward from bottom floor; and c) said outer threads of said lower reservoir section are inwardly offset from the outer surface of said upper reservoir section so as to provide an outer annular groove defined at its bottom by a supporting shoulder of said lower reservoir section, said upper reservoir section which is defined by said outer annular groove adapted to receive said outer threads of said lower reservoir section by an outer rim of said lower reservoir section, the width of the respective outer and inner groove being such that when engaged said inner and outer threads are continuous when the sections are assembled, a rubber seal between said upper and lower reservoir sections is provided to prevent leakage.

4. An automatic self-watering plant pot device, as claimed in claim 3, wherein said engaging means comprises a rim formed in a lower inner periphery of said cylinder and a rim formed in an upper inner periphery of said upper reservoir, having said rim of lower reservoir inner periphery resting on said rim in upper outer periphery cooperatively configured and dimensioned to form a continuous interengagement surface when said cylinder rests on said refillable reservoir housing in such an arrangement serving to inhibit and close said refillable reservoir housing against evaporation and the drying out of a growing media roots.

5. An automatic self-watering plant pot device, as claimed in claim 4, wherein said dual feeding wick for transmission of said liquids to said growing medium of a plant comprises:

a) an absorbent adjustable bi-expandable material with a capillary action used for regulating the transmission of said liquids in said refillable reservoir housing, b) an absorbent material loosely placed within said cylinder housing, an absorbent material inserted upwardly into said bottom floor of said cylinder through said chamber opening and loosely looped downwardly through an adjacent chamber opening having both ends extend to said refillable reservoir housing bottom floor, whereby liquids are transmitted from said reservoir housing through said dual feeding wick to said cylinder though capillary action.

6. An automatic self-watering plant pot device, as claimed in claim 5, wherein said refill light indicator for regulating said liquids comprises:

a) an indicator stem extending from the upper flange of said refillable reservoir housing to the bottom floor, being in open communication there with said liquids, b) having outer threads located at bottom end of stem and sphere with a light emitting diode mounted at top of stem, c) a stem guide sprout housing located in upper flange of said refillable reservoir housing comprising, the battery housing case and an indicator stem guide that allow free movement up and down of said indicator stem, d) a transparent said light emitted diode positioned on said sphere having a flashing light capability to alert plant owner as to low water level, e) said sphere mounted on top of said indicator stem to provide a manual means of alerting plant owner as to low water level, f) said battery housing case is equipped with an enclosed battery which causes said light emitting diode to blink on and off when contact is made, and g) a float attach to the bottom end of said indicator stem having inner threads, configured and dimensioned to form a continuous inter-locking engagement with bottom end of said indicator stem, the said float being free to float within said refillable reservoir housing is in constant communication with said liquids.

\* \* \* \* \*